(12) United States Patent
Minakawa et al.

(10) Patent No.: US 6,448,969 B1
(45) Date of Patent: Sep. 10, 2002

(54) TOPOGRAPHIC DISPLAY SYSTEM

(75) Inventors: Rumi Minakawa; Masaki Watanabe; Hiroshi Saitou; Norimasa Kishi, all of Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/402,543

(22) PCT Filed: Feb. 19, 1999

(86) PCT No.: PCT/JP99/00755

§ 371 (c)(1),
(2), (4) Date: Oct. 6, 1999

(87) PCT Pub. No.: WO99/42979

PCT Pub. Date: Aug. 26, 1999

(30) Foreign Application Priority Data

Feb. 20, 1998 (JP) ............................................. 10-039258

(51) Int. Cl.[7] ............................................... G06T 17/00
(52) U.S. Cl. ....................... 345/428; 345/427; 345/421; 345/426
(58) Field of Search ................................. 345/421, 426, 345/427, 428, 419, 618, 7, 9, 619, 648; 701/14, 301, 213, 208, 4, 8; 340/995; 342/26, 33

(56) References Cited

U.S. PATENT DOCUMENTS 3,988,731 A * 10/1976 Young .......................... 342/33
4,941,193 A * 7/1990 Barnsley et al. ............ 345/648

FOREIGN PATENT DOCUMENTS

| GB | 0473152 B1 | * | 4/1992 | ........... G06T/17/20 |
| JP | 358001237 A | * | 1/1983 | ........... G01S/05/02 |
| JP | 4-133183 | | 5/1992 | |
| JP | 408114663 A | * | 5/1996 | ........... G01S/05/02 |
| JP | 9-134121 | | 5/1997 | |

OTHER PUBLICATIONS

Phillips et al ("An Assessment of Computer Generated Space Situation Map Projections": ACM 1983–ISBN: 0–89791–121–0/83/012/0135).*

* cited by examiner

Primary Examiner—Mark Zimmerman
Assistant Examiner—Mano Padmanabhan
(74) Attorney, Agent, or Firm—McDermott, Will & Emery

(57) ABSTRACT

In a stereoscopic landform display apparatus disclosed herein, landform data comprising altitude value of landform are stored in an external storage (3), and when a display subject region to be displayed is designated by a display reference point and-the-like output section (5), landform data designated by this display subject region are read from the external storage (3), altitude magnification for emphasizing and displaying undulation state is obtained by a computation unit (1) based on landform data in this region, a computation of a stereoscopic landform image is performed from an altitude value which is multiplied by this altitude magnification, and this stereoscopic landform image is displayed to an image display section (7).

14 Claims, 16 Drawing Sheets

DISPLAY REGION (B)

DISPLAY REGION (C)

VISUAL POINT

VARIATION OF SELECTION
LANDFORM DATA IN REGION
BEFORE BROADENED

VARIATION OF SELECTION
LANDFORM DATA IN
REGION AFTER BROADENED

TOPOGRAPHIC DISPLAY SYSTEM

TECHNICAL FIELD

The present invention relates to a stereoscopic landform display apparatus for displaying landform stereoscopically based on landform data, and more particularly, to a stereoscopic landform display apparatus capable of automatically determining an altitude value to be displayed in accordance with asperity exhibiting concavities and convexities of ground.

BACKGROUND ART

Conventionally, there is reported an example for displaying a stereoscopic landform as shown in FIGS. 19 and 20 by a stereoscopic landform display apparatus which displays the map while uniformly changing and emphasizing the altitude value in accordance with an altitude magnification input by a user.

However, according to such a conventional stereoscopic landform display apparatus, even in relatively flat urban area or relatively steep-sided mountainous area, for example, since the landform is displayed at the same altitude magnification uniformly, when it is desired to emphasize the difference in altitude in urban area, or when it is unnecessary to emphasize and display at altitude magnification in mountainous area to the contrary, there are problems that it is necessary for a user to determine an appropriate altitude magnification each time by himself or herself, and the input operation of the altitude magnification is troublesome.

The present invention has been accomplished in view of such circumstances, and it is an object of the invention to provide a stereoscopic landform display apparatus capable of displaying an easy-to-see stereoscopic landform image in accordance with landform state of a display subject region.

DISCLOSURE OF INVENTION

A stereoscopic landform display apparatus according to the present invention comprises, landform data storing means for storing landform data including altitude value of a landform, display region designating means for designating a display subject region to be displayed, computation means which reads the landform data designated by the display subject region from the landform data storing means, obtains altitude magnification for emphasizing and displaying an undulation state of the landform based on the landform data within this region, and performs a computation of a stereoscopic landform image from the altitude value which is multiplied by this altitude magnification, and image display means for displaying the stereoscopic landform image.

With this structure, the landform data comprising altitude value of landform are stored, and when a display subject region to be displayed is designated, landform data designated by this display subject region are read, altitude magnification for emphasizing and displaying undulation state is obtained based on landform data in this region, a computation of a stereoscopic landform image is performed from an altitude value which is multiplied by this altitude magnification, and this stereoscopic landform image is displayed. Therefore, it is possible to display easy-to-see stereoscopic landform image in accordance with a state of landform in the display subject region. As a result, it is possible to automatically determine the altitude magnification such that when the landform is flat, asperity of the landform is emphasized, and when the landform is steep, the asperity of the landform is not emphasized.

It is preferable that the computation means comprises, reference altitude value determining means which reads, from the landform data storing means, landform data in a range covering the display subject region, and determines altitude value of a reference point displayed in display subject region based on this landform data, actual asperity value determining means for determining an actual asperity value indicative of undulation state of the landform based on the read landform data, altitude magnification determining means for determining the altitude magnification in the display subject region based on this actual asperity value, display altitude value generating means for generating display altitude value by multiplying each of the altitude values forming the read landform data by this altitude magnification, display data generating means for generating landform display graphic data which are required for displaying the landform based on this display altitude value, coordinate conversion means for coordinate converting this landform display graphic data to a stereoscopic landform image, and drawing means for drawing this stereoscopic landform image on the image display means.

With this structure, landform data in a range covering the display subject region are read, and altitude value of the reference point displayed in display subject region is determined based on this landform data. Next, the actual asperity value indicative of undulation state of the landform is determined based on the read landform data, the altitude magnification in the display subject region is determined based on this actual asperity value. Next, the display altitude value is generated by multiplying each of the altitude values forming the read landform data by this altitude magnification, and landform display graphic data which are required for displaying the landform are generated based on this display altitude value. Then, this landform display graphic data is coordinate converted into the stereoscopic landform image. Therefore, it is possible to automatically determine the altitude magnification such that when the landform is flat, asperity of the landform is emphasized, and when the landform is steep, the asperity of the landform is not emphasized.

It is preferable that the actual asperity value determining means determines the actual asperity value using landform data within a region previously defined in the vicinity of the display reference point.

With this structure, the actual asperity value is determined using landform data within a region previously defined in the vicinity of the display reference point. Therefore, in a bird's eye view for example, it is possible to ignore the landform data information whose influence on a direct display result such as a region far from a visual point displayed while compressed is expected to be small. As a result, it is possible to reduce the calculation amount to relatively small value.

It is preferable that the altitude magnification determining means includes input means for inputting a value for designating altitude magnification, and determines a quotient obtained by dividing this input value input by the actual asperity value, as the altitude magnification.

With this structure, the value for designating altitude magnification is input, and the quotient obtained by dividing this input value input by the actual asperity value is determined as the altitude magnification. Therefore, it is possible to display in accordance with a user's taste using elevation which is a relatively easy index. It is possible to avoid an operational troublesome that the user must frequently reset the altitude magnification.

Further, it is preferable that the altitude magnification determining means determines the altitude magnification such that it becomes equal to a predetermined value or greater.

With this structure, since the altitude magnification is determined such that it becomes equal to a predetermined value or greater, when the altitude magnification becomes small even through the actual asperity value is great for example, it is possible to prevent the landform from being displayed flatly as compared with the actual landform by defining the lower value of the altitude magnification value as described above.

It is preferable that the drawing processing means visually draws a shape indicative of degree of the altitude magnification independently from drawing of the stereoscopic landform image.

With this structure, since the drawing means visually draws a shape indicative of degree of the altitude magnification independently from drawing of the stereoscopic landform image, it is possible to estimate the original asperity state intuitively from the display screen.

Further, it is preferable that the landform data storing means stores map data including map elements including at least roads and place names, in addition to the landform data; the display region designating means reads the map element designated by the display subject region from the landform data storing means together with the landform data; the display data generating means generates display graphic data also with respect to the map element which is read; the coordinate conversion means carries out coordinate conversion also for the display graphic data; and the drawing processing means draws the display graphic data which is coordinate converted together with the landform display graphic data.

With this structure, the map data including map elements including at least roads and place names are stored, in addition to the landform data, the map element designated by the display subject region is read from the landform data storing means together with the landform data, the display graphic data are made also with respect to the read map element. Next, coordinate conversion is carried out also for this display graphic data, and the display graphic data which is coordinate converted is drawn. Therefore, it is possible to also display the map elements on the stereoscopic landform image and for example, it is possible to display the stereoscopic landform image and the map element and to use for guiding roads as a navigator.

Further, it is preferable that the computation means comprises, reference altitude value determining means which reads, from the landform data storing means, landform data in a range covering the display subject region, and determines altitude value of a reference point displayed in display subject region based on this landform data, actual asperity value determining means for determining an actual asperity value indicative of undulation state of the landform based on the read landform data, altitude magnification determining means for determining the altitude magnification in the display subject region based on this actual asperity value, display altitude value generating means for generating display altitude value by multiplying each of the altitude values forming the read landform data by this altitude magnification, landform display color determining means for determining display color of the landform based on this display altitude value, display data generating means for generating landform display graphic data which are required for displaying the landform based on this display altitude value or altitude value, coordinate conversion means for coordinate converting this landform display graphic data to a stereoscopic landform image, and drawing means for drawing this stereoscopic landform image on the image display means using this landform display color.

With this structure, the landform data in a range covering the display subject region is read, and the altitude value of a reference point displayed in display subject region is determined based on this landform data. Next, the actual asperity value indicative of undulation state of the landform is determined based on the read landform data, and the altitude magnification in the display subject region is determined based on this actual asperity value. Then, the display altitude value is generated by multiplying each of the altitude values forming the read landform data by this altitude magnification, and the display color of the landform is determined based on this display altitude value. Then, the landform display graphic data which are required for displaying the landform are made based on this display altitude value or altitude value, and this landform display graphic data is coordinate converted into a stereoscopic landform image, and this stereoscopic landform image is drawn using this landform display color. Therefore, even in a relatively flat landform, its asperity is emphasized by display color, and the stereoscopic shape can easily be seen. Further, when the shape is not emphasized and only the display color is emphasized, it is possible to see the information of altitude change by the change of display color, and to avoid a display manner that a high place near the current place obstructs a user's view and as a result, it is possible to secure a line-of-sight up to far place.

Further, it is preferable that the actual asperity value determining means broadens up to landform data possessed by a region which is not displayed around the display subject region, and refers to the broadened landform data, thereby determining the actual asperity value.

With this structure, the actual asperity value determining means broadens up to landform data possessed by a region which is not displayed around the display subject region, and refers to the broadened landform data, thereby determining the actual asperity value and therefore, by increasing the number of broadened landform data, even if the display region moves with time as the visual point moves, a reading amount G of landform data to be displayed is reduced relatively and as a result, the variation of the altitude magnification is smoothened gently, and it is possible to display the easy-to-see image.

Further, it is preferable that the actual asperity value determining means broadens landform data to be referred along an expectable traveling direction, thereby determining the actual asperity value.

With this structure, the actual asperity value determining means broadens landform data to be referred along an expectable traveling direction, thereby determining the actual asperity value and therefore, the altitude magnification is determined on the assumption that the landform data are selected in accordance with the moving direction of the visual point which is broadened along the traveling direction, a reading amount G of landform data to be displayed is reduced relatively and as a result, the variation of the altitude magnification is smoothened gently, and it is possible to display the easy-to-see image.

Further, it is preferable that the altitude magnification determining means determines the altitude magnification using altitude value at the display reference point, in addition to the actual asperity value.

With this structure, the altitude magnification determining means determines the altitude magnification using altitude value at the display reference point, in addition to the actual asperity value, even if the same actual asperity value is obtained, it is possible to automatically set the magnification which differs in accordance with difference in height of the position of the vehicle (display reference point), and for example, it is possible to control the magnification such that when the vehicle is in a low place in the altitude distribution in the entire display region, the magnification is suppressed to a low value, and when the vehicle is in a place of intermediate height, the magnification is emphasized.

Further, it is preferable that the altitude magnification determining means determines the altitude magnification by referring also to altitude magnification which was determined in the past.

With this structure, the altitude magnification determining means determines the altitude magnification by referring also to altitude magnification which was determined in the past and therefore, the variation of the altitude magnification with time is smoothened gently, and it is possible to display the easy-to-see image.

Further, it is preferable that the altitude magnification determining means determines the altitude magnification such that it becomes equal to a predetermined value or less.

With this structure, since the altitude magnification is determined such that it becomes equal to a predetermined value or less, it is possible to prevent the altitude magnification from being emphasized excessively and as a result, it is possible to display the easy-to-see stereoscopic landform image.

Further, it is preferable that the landform display color determining means determines a display color corresponding to a predetermined lower limit value instead of this display altitude value when the display altitude value becomes extremely small, and determines a display color corresponding to a predetermined upper limit value instead of this display altitude value when the display altitude value becomes extremely great.

With this structure, the display color corresponding to a predetermined lower limit value is determined instead of this display altitude value when the display altitude value becomes extremely small, and the display color corresponding to a predetermined upper limit value is determined instead of this display altitude value when the display altitude value becomes extremely great and therefore, it is possible to define the table in which the display altitude values and display colors are corresponding to one another within a relatively small range, and it is possible to reduce the number of necessary colors.

BEST MODE FOR CARRYING OUT THE INVENTION

To describe the present invention in more detail, embodiments of the invention will be explained with reference to the drawings below.

(First Embodiment)

Figure 1:
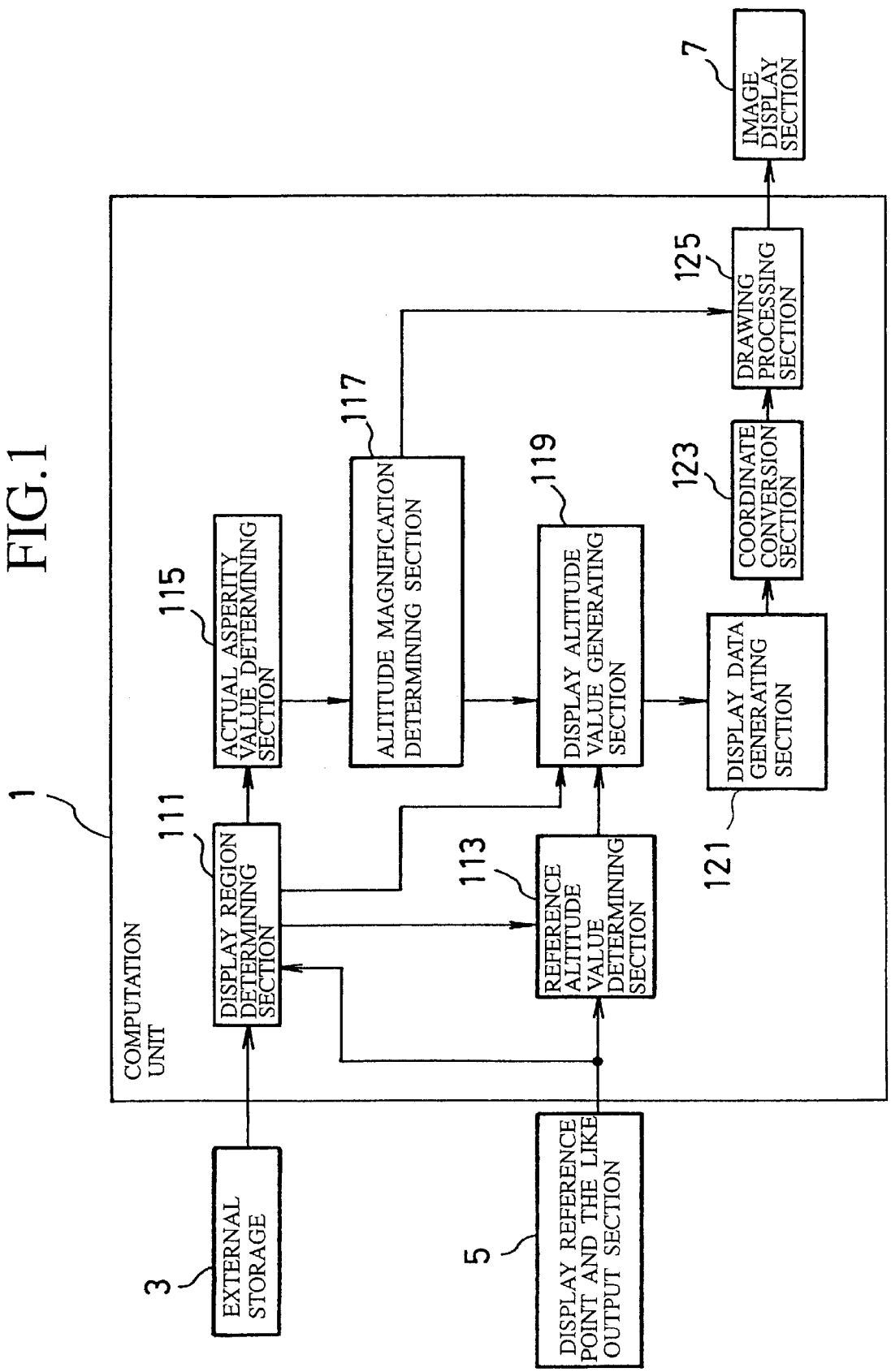
FIG. 1 is a block diagram showing the structure of functional elements of a stereoscopic landform display apparatus according to a first embodiment of the present invention.

FIG. 1 is a block diagram showing the structure of a stereoscopic landform display apparatus according to a first embodiment of the present invention.

In FIG. 1, an external storage 3 stores landform data comprising altitude value of actual landform. A display reference point and-the-like output section 5 outputs a display reference point position and a direction angle for determining position and direction of a display subject region. A computation unit 1 performs computations required for displaying stereoscopic landform to display the stereoscopic landform image to an image display section 7.

Further, if the computation unit 1 is divided by function, a display subject region determining section 111 determines a display subject region display on a screen based on the display reference point position and direction angle which are output from the display reference point and-the-like output section 5, and reads necessary landform data from the external storage 3. A reference altitude value determining section 113 determines a display reference point position which is output from the display reference point and-the-like output section 5 and an altitude value of a display reference point based on the read landform data. An actual asperity value determining section 115 determines an actual asperity value which shows terrain roughness qualitatively based on the read landform data. A altitude magnification determining section 117 obtains the altitude magnification based on the actual asperity value which is obtained in the above-described manner. A display altitude value generating section 119 generates the display altitude value by multiplying each of the altitude values which are read in this manner by altitude magnification. A display data generating section 121 make display design data for displaying landform based on the display altitude value generated in this manner. A coordinate conversion section 123 performs a coordinate conversion from this display design data into image coordinates constituting a stereoscopic landform image. A drawing processing section 125 outputs the stereoscopic landform image after coordinate conversion to the image display section 7.

With reference to FIGS. 1, 3 to 8, and 17 to 20, and using a flowchart shown in FIG. 2, the operation of the stereoscopic landform display apparatus of the first embodiment of the invention will be explained.

Figure 2:
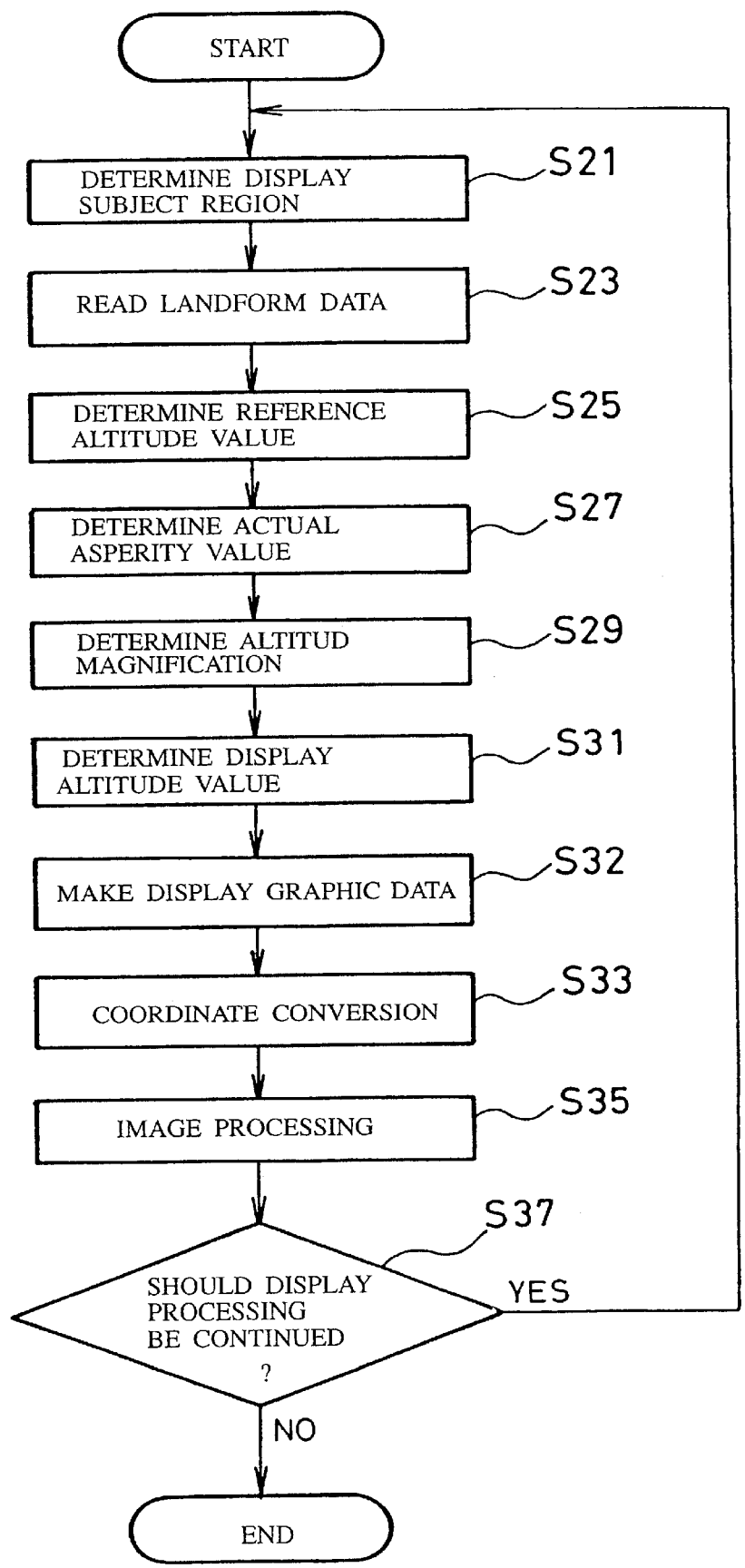
FIG. 2 is a flowchart for explaining the operation of the stereoscopic landform display apparatus according to the first embodiment of the invention.
Figure 3:
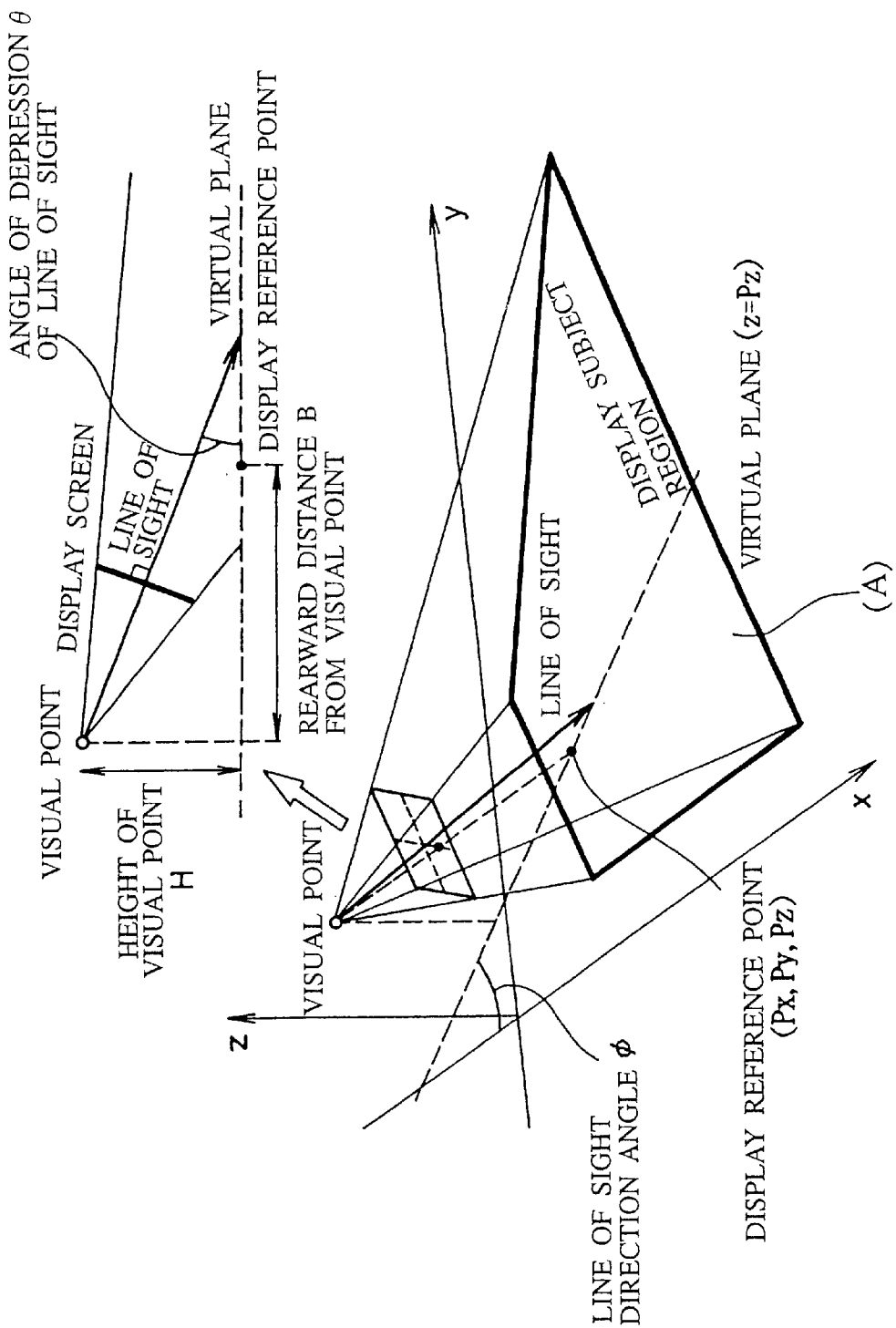
FIG. 3 is a view showing the relation between a display reference point and a subject display region when perspective projection is carried out.
Figure 4:
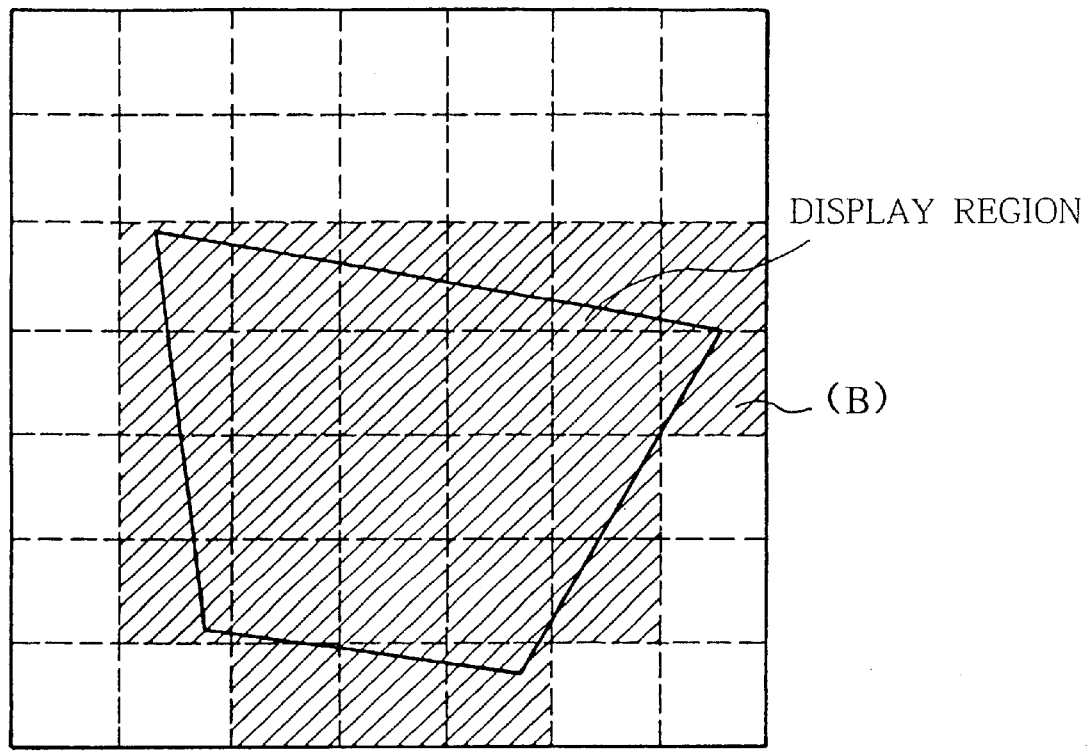
FIG. 4 is a view for explaining a range of a map to be read by a display region determining section 111 from an external storage 3.
Figure 5:
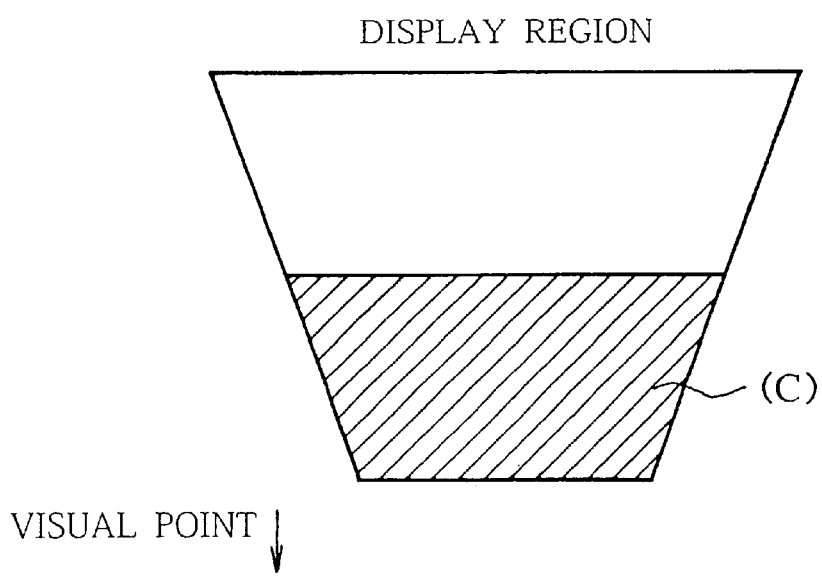
FIG. 5 is a view for explaining a method for limiting display region into certain region to obtain a display asperity value.
Figure 6:
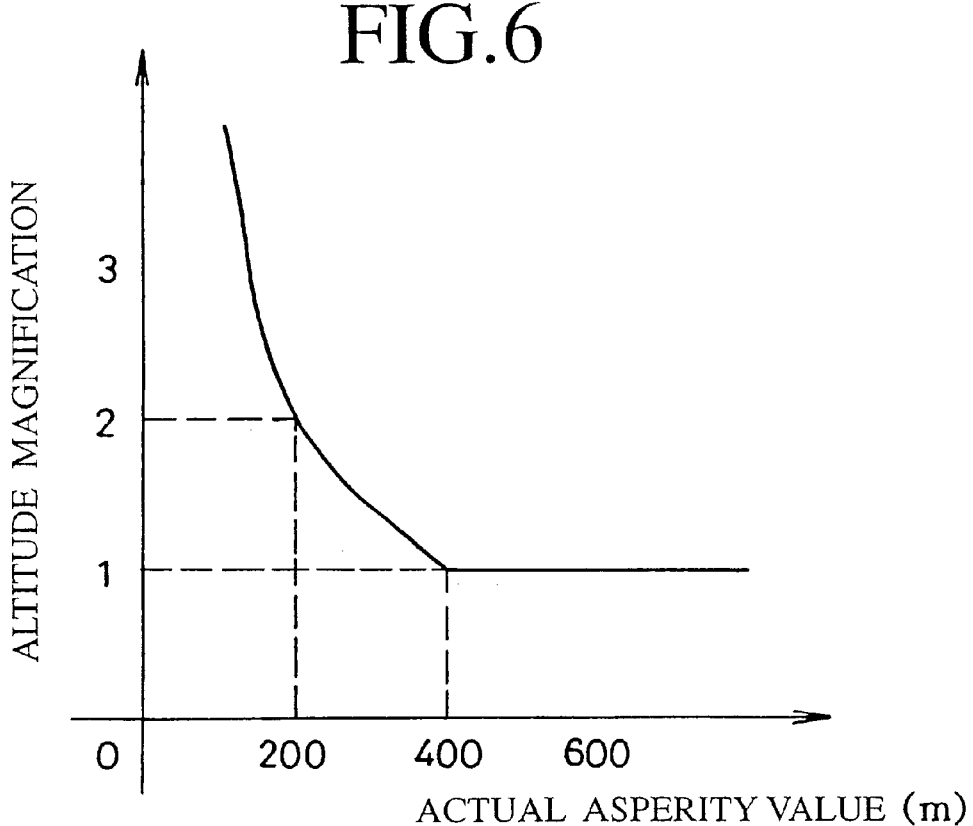
FIG. 6 is a view showing one example of a graph indicating the relation between an actual asperity value and altitude magnification corresponding to this actual asperity value.
Figure 7:
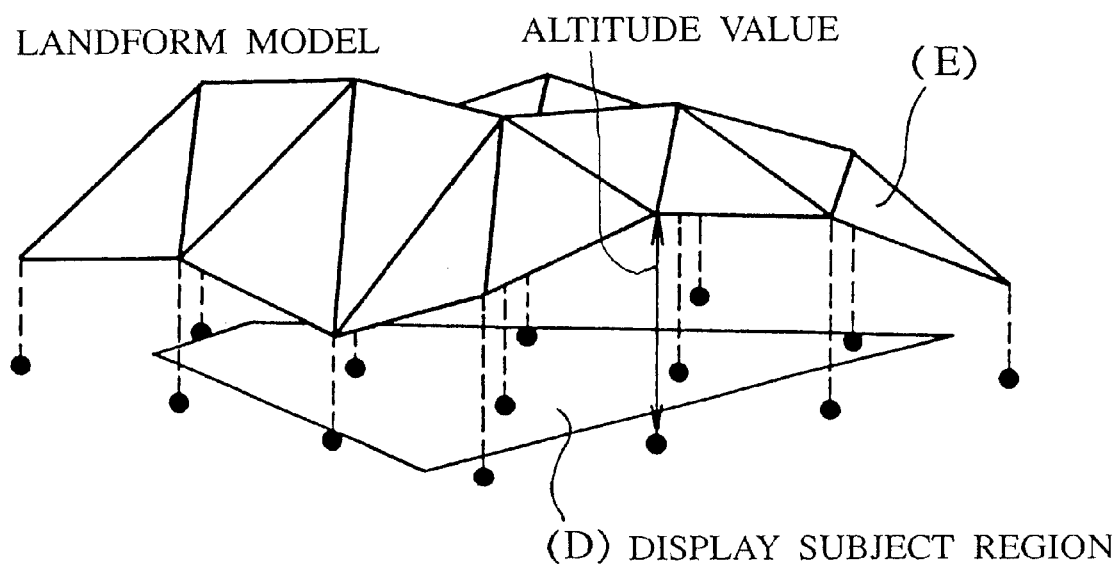
FIG. 7 is a view for explaining a method for modeling a landform.
Figure 8A:
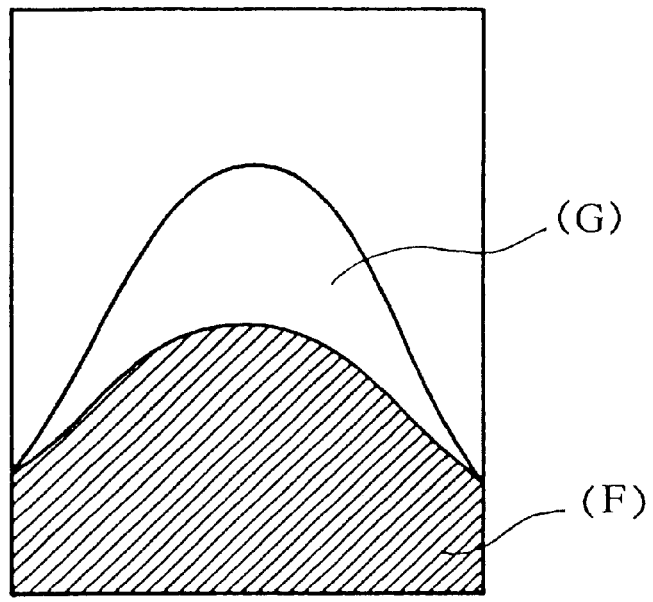
FIG. 8(a) and FIG. 8(b) are view showing one example when the altitude magnification as design.
Figure 8B:
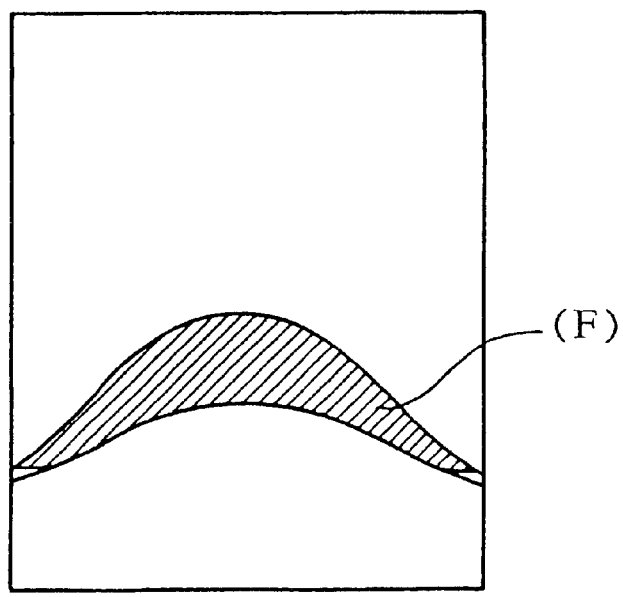

FIG. 2 is the flowchart for explaining the operation of the stereoscopic landform display apparatus according to the first embodiment of the invention. FIG. 3 is a view showing the relation between a display reference point and a subject display region when perspective projection is carried out. FIG. 4 is a view for explaining a range of a map to be read by a display region determining section 111 from an external storage 3. FIG. 5 is a view for explaining a method for limiting display region into certain region to obtain a display asperity value. FIG. 6 is a view showing one example of a graph indicating the relation between an actual asperity value and altitude magnification corresponding to this actual asperity value. FIG. 7 is a view for explaining a method for modeling a landform. FIG. 8 is a view showing one example when the altitude magnification as design.

First, in step S21, the display region determining section 111 determines a display subject region which is displayed on the screen based on the positional coordinates of the display reference point and direction angle which are output from the display reference point and-the-like output section 5.

In generally, in order to display a stereoscopic shape on a two-dimensional screen, three-dimensional shape model is constructed and this is projection converted into screen coordinates. For this purpose, a point on the landform which is projected on a predetermined fixed point in the display screen is defined as a display reference point, and a direction on the landform corresponding to an upward direction on the screen is defined as a direction angle, determination is made as to which port of the landform model should be projected to which direction. For example, the stereoscopic landform display apparatus is mounted to a vehicle and is used for guiding roads such as a navigator, it is required to display the landform from a region around the current position of the vehicle to a region in the traveling direction. In this case, it is possible to use a position measuring apparatus, as the display reference point and-the-like output section 5, which measures and outputs the current position and the traveling direction of the vehicle by a GPS receiver, a vehicle speed sensor, a gyro sensor or the like.

As the projection conversion, any method such as orthographic projection and perspective projection may be used, but it is necessary to previously determine what kind of projection conversion is used. That is, if the kind of projection conversion is previously determined, it is possible to obtain the display subject region of the landform to be projected on the display screen using the given display reference point and the direction angle.

For example, in a case such as when a bird's eye view is generated, if the perspective projection conversion is used while a point which is rearward by a distance B from the display reference point and upward by height H from the display reference point is defined as a projection center (visual point) and a looking down direction at an angle of depression $\theta$ is defined as an axis of projection (line of sight), the display subject region is as shown with a trapezoidal region (A) in FIG. 3. In the present embodiment, z=Pz having the same altitude as the altitude value Pz of the display reference point is virtually set for simplification, and the display subject region is defined on this virtual plane.

Back to FIG. 2, in step S23, the display region determining section 111 reads landform data having a range sufficiently covering the display subject region obtained in step S21 from the external storage 3. A plurality of maps (meshes) divided into certain size are stored in the external storage 3, and in order to read the range sufficiently covering the display subject region, if the display region is a trapezoidal region within the solid line shown in FIG. 4, the meshs of the hatched portion (B) may be read. If the landform data can obtain the altitude value z of that point with respect to two-dimensional positional coordinates (x, y), it is possible to display the altitude list of representative point of each of the meshes, vector of contour lines and-the-like.

Back to FIG. 2, in step S25, the reference altitude value determining section 113 obtains an altitude value pz of the display reference point (which will be referred to as "reference altitude value). In generally, since the display reference point and-the-like output section 5 does not necessarily output up to the altitude value (z value) of the display reference point, two-dimensional position coordinates (Px, Py) is applied to the landform data which is read in step S23, thereby obtaining a corresponding altitude value.

Next, in step S27, the actual asperity value determining section 115 converts the asperity which is a undulation of ground into numerical form as the actual asperity based on the landform data which is read in step S23. A method for obtaining a difference between the maximum altitude value and the minimum altitude value of the display region (maximum-minimum altitude difference), a method for taking dispersion of an altitude value of the display region are admissible as a method for determining this actual asperity value. Further, based on a plane area SO of the display region and a surface area S of the landform of the display region, actual asperity value=$(S-SO)/SO$ may be obtained as a area ratio.

In the actual asperity value determining section 115, the difference between the maximum altitude value and the minimum altitude value, the dispersion, the area ratio and the like of the landform data included in the display region may be obtained when the actual asperity value is determined. In the above-described bird's-eye view, if the fact that a region far from the visual point is compressed and displayed is taken into consideration, it can be considered that influence exerted on display is smaller in the region far from the visual point and therefore, as the hatched region (C) in FIG. 5, the actual asperity value in only a portion of region near the visual point among the display region may be obtained.

Back to FIG. 2, in step S29, the altitude magnification determining section 117 determines the altitude magnification based on the actual asperity value determined in step S27.

In the present embodiment, the actual asperity value uses the maximum-minimum altitude difference $\Delta H$, the altitude magnification corresponding to this actual asperity value is determined as shown in a graph in FIG. 6. The graph shown in FIG. 6 means that an area whose altitude difference $\Delta H$ is 400 m or less is taken as a relatively flat area, and in such a flat area, the altitude magnification is determined such that the altitude difference $\Delta H$ becomes 400 m for a reason of display, i.e., the altitude magnification becomes $400/\Delta H$, and in a case of landform having the altitude difference $\Delta H$ is 400 or greater, since such landform is displayed as it is, there is enough asperity, the altitude magnification is set to 1.

In step S31, the display altitude value generating section 119 converts the altitude value in the display region into the actual altitude value indicative of display altitude value based on the reference altitude value determined in step S25 and the altitude magnification determined in step S29. As a generating method of the display altitude value, each of the actual altitude values may simply be multiplied by the altitude magnification, and a relative difference of reference altitude value of each of the actual altitude values may be multiplied by the altitude magnification. However, in the case of the former method, it is necessary to change the visual point position by also multiply the reference altitude value itself by the same altitude magnification, thereby setting the visual point higher than the landform model after multiplication of the altitude magnification.

Next, in step S32, the display data generating section 121 makes three-dimensional model (which will be referred to as "display graphic data" hereinafter) of a landform using the display altitude value obtained in step S31. More specifically, sufficient number of two-dimensional coordinate points are defined within a display subject region (D) as shown in FIG. 7 for example, or within its periphery, an altitude value of each of the two-dimensional coordinate points is obtained from the display altitude value, and a polyhedron shape is made using a point in three dimensional space as an apex to which each of display altitude values is given. In the drawing process which will be described latter, polygon (E) indicative of each of surface of this polyhedron is projection converted and drawn.

Next, in step S33, the coordinate conversion section 123 carry out the projection conversion of each element of display graphic data into the screen coordinates for displaying the stereoscopic landform on the two-dimensional screen. For example, the visual point is defined rearward from the display reference point as described above, and perspective projection conversion processing is carried out while using this visual point as a projection center.

Next, in step S35, the drawing processing section 125 draws each of element graphic (polygon) of display graphic data converted into screen coordinates and outputs the same to the image display section 7. At that time, a shape indicative of the altitude magnification calculated in step S29 is displayed on the screen display section 7. For example, when the shape indicative of altitude magnification shown in FIGS. 8(*a*) and 8(*b*), the altitude magnifications are 2 times and 0.5 times, respectively. In FIGS. 8(*a*) and 8(*b*), when the hatched mountain (F) is an actual landform, a mountain(G) which is not hatched is a landform which is displayed.

Finally, in step S37, the computation unit 1 judges whether the display process should be continued. If YES, the procedure is returned to step S21, and the series of processing is repeated. If NO, the processing is terminated.

(Second Embodiment)

Figure 9:
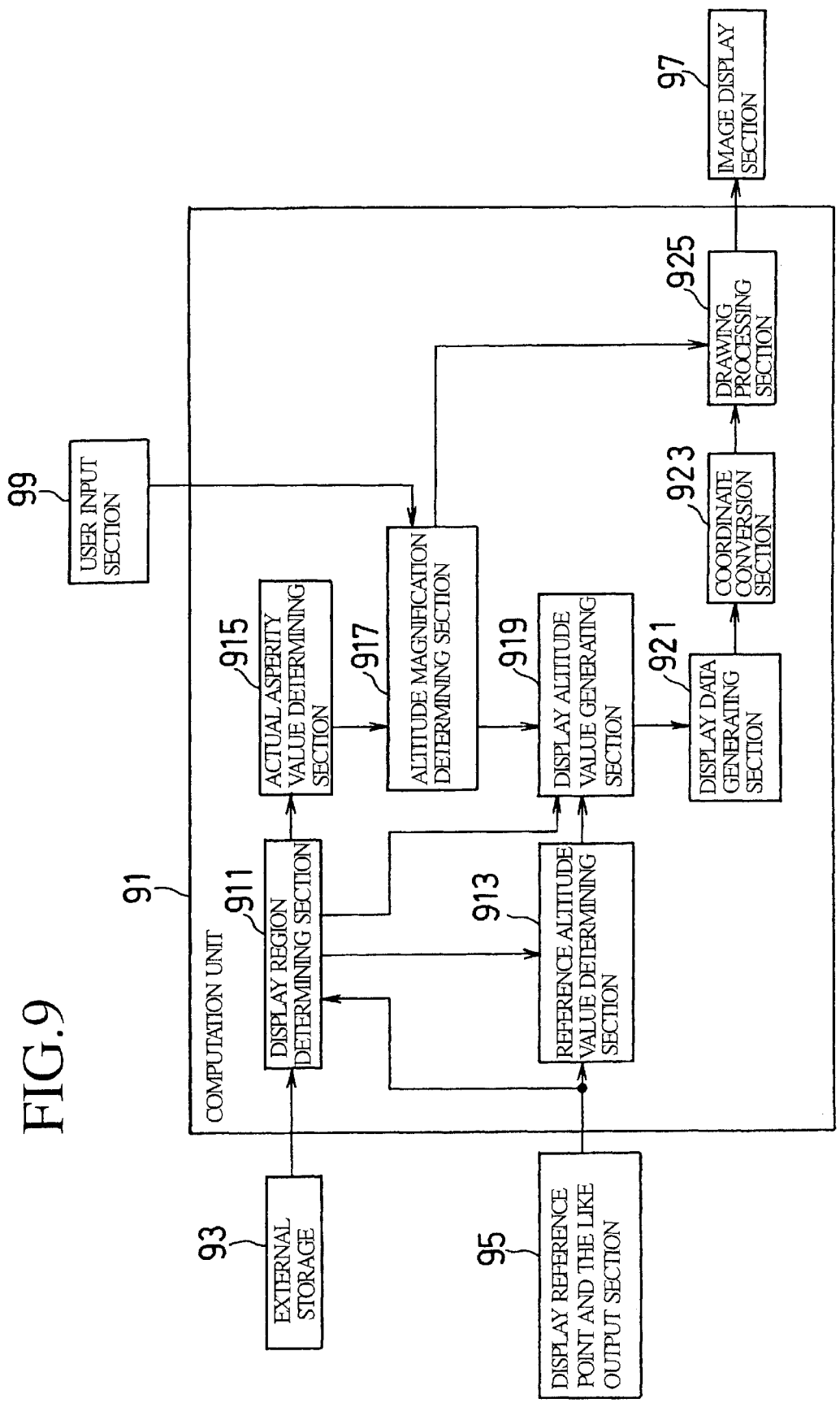
FIG. 9 is a block diagram for showing an example of structure of functional elements of a stereoscopic landform display apparatus according to a second embodiment of the invention.

FIG. 9 is a block diagram for showing a structure of functional elements of a stereoscopic landform display apparatus according to a second embodiment of the invention.

In FIG. 9, an external storage 93 stores landform data comprising altitude value of actual landform. A display reference point and-the-like output section 95 outputs a display reference point position and a direction angle for determining position and direction of a display subject region. A computation unit 91 performs computations required for displaying stereoscopic landform to display the stereoscopic landform image to an image display section 97.

Further, if the computation unit 1 is divided by function, a display subject region determining section 911 determines a display subject region display on a screen based on the display reference point position and direction angle which are output from the display reference point output, and reads necessary landform data from the external storage 93. A reference altitude value determining section 913 determines a display reference point position which is output from the display reference point and-the-like output section 95 and an altitude value of a display reference point based on the read landform data. An actual asperity value determining section 915 determines an actual asperity value which shows terrain roughness qualitatively based on the read landform data. A altitude magnification determining section 917 obtains the altitude magnification based on the actual asperity value which is obtained in the above-described manner. A display altitude value generating section 919 generates the display altitude value by multiplying each of the altitude values which are read in this manner by altitude magnification. A display data generating section 921 makes display design data for displaying landform based on the display altitude value generated in this manner. A coordinate conversion section 923 performs a coordinate conversion from this display design data into image coordinates constituting a stereoscopic landform image. A drawing processing section 925 outputs the display graphic data after coordinate conversion to the image display section 97 as a stereoscopic landform image. User input section 99 inputs the designated value with reference to an altitude magnification by user's operation.

Figure 17:
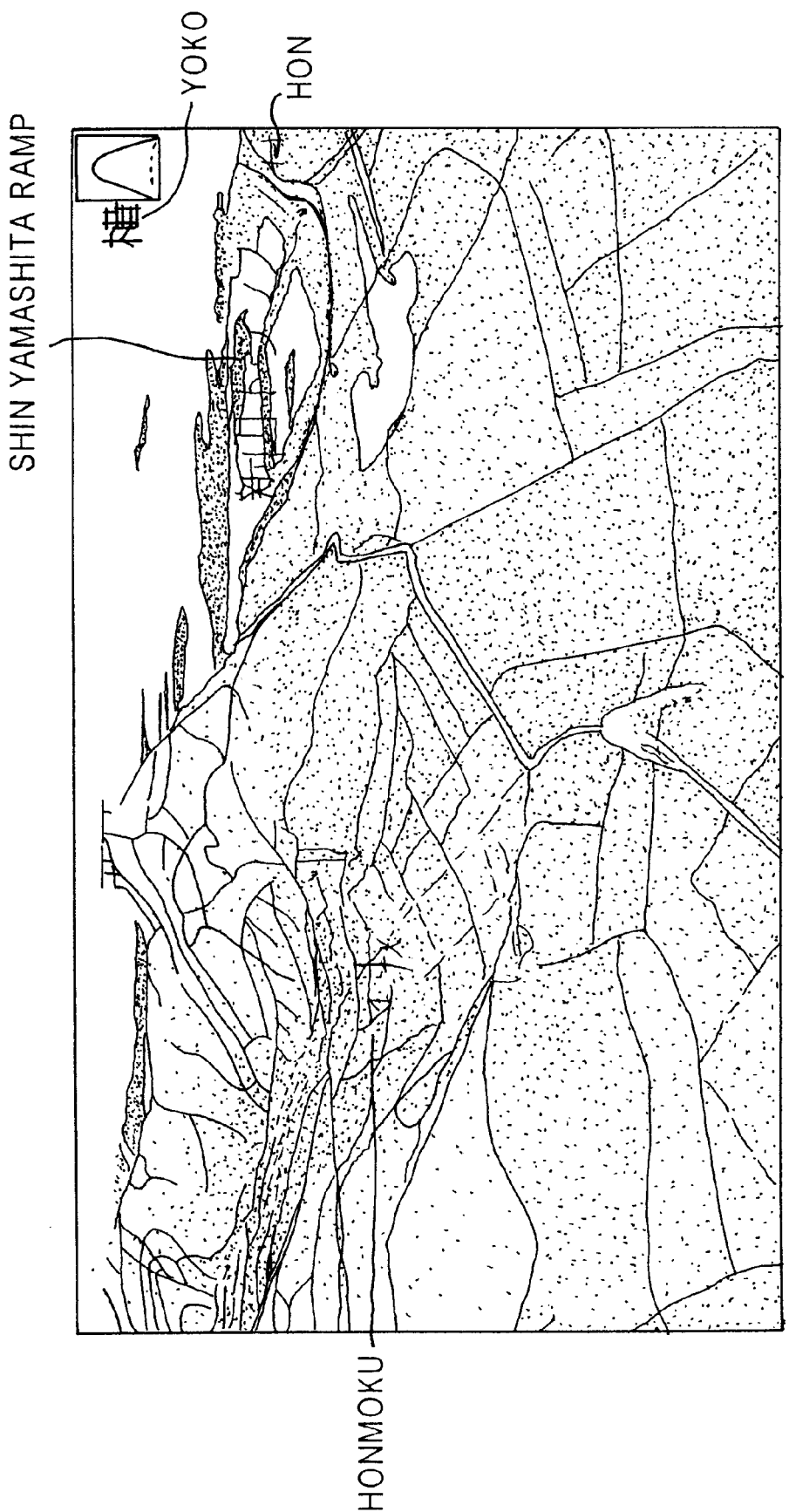
FIG. 17 is a view showing an example of stereoscopic image display of a stereoscopic landform display apparatus of the second embodiment corresponding to a display example (altitude magnification 1) of stereoscopic landform of a conventional stereoscopic landform display apparatus shown in FIG. 19.
Figure 18:
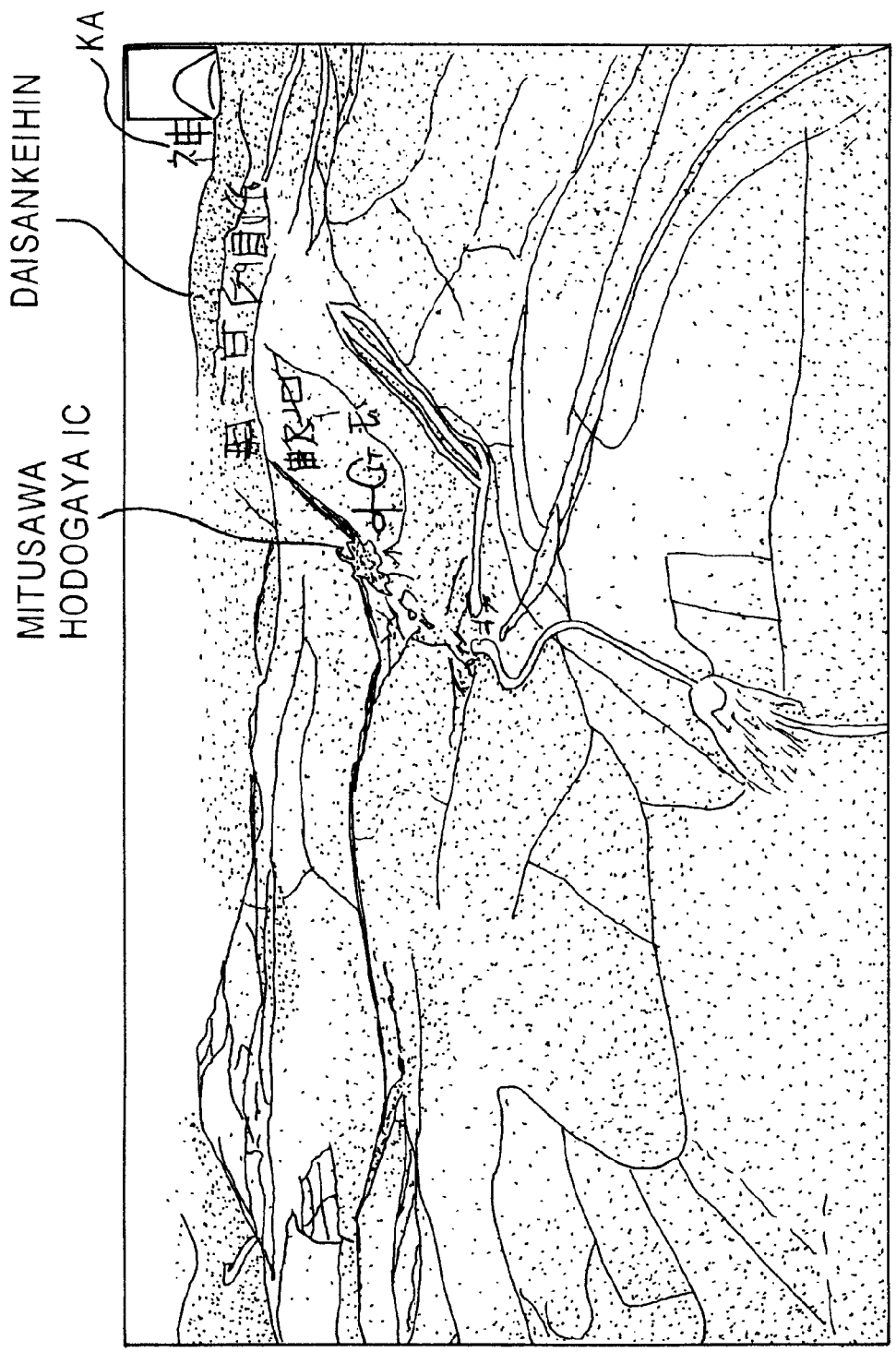
FIG. 18 is a view showing an example of stereoscopic image display of a stereoscopic landform display apparatus of the second embodiment corresponding to a display example (altitude magnification 1) of stereoscopic landform of a conventional stereoscopic landform display apparatus shown in FIG. 20.
Figure 19:
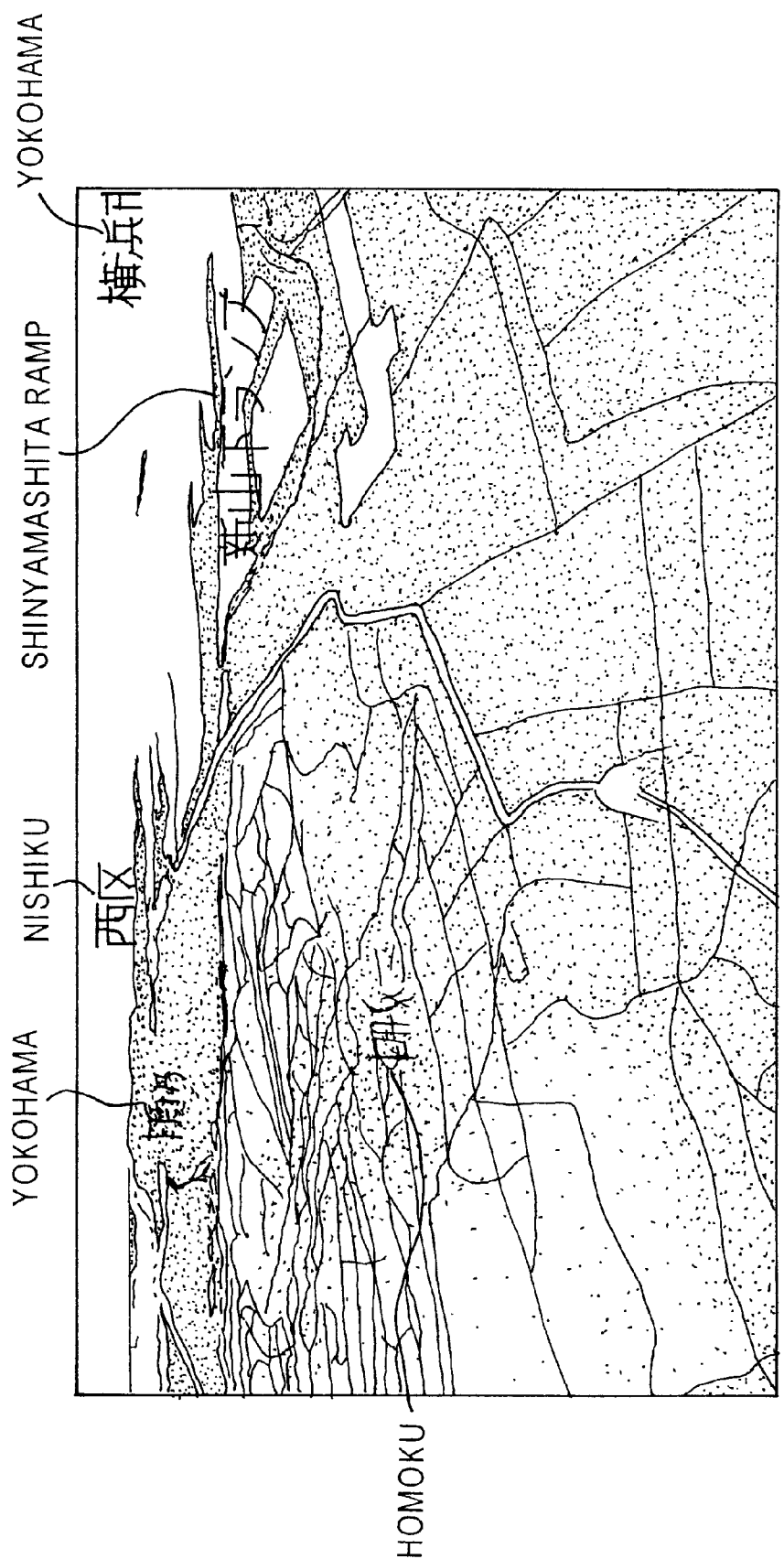
FIG. 19 is a view showing an example of stereoscopic image display of the conventional stereoscopic landform display apparatus.
Figure 20:
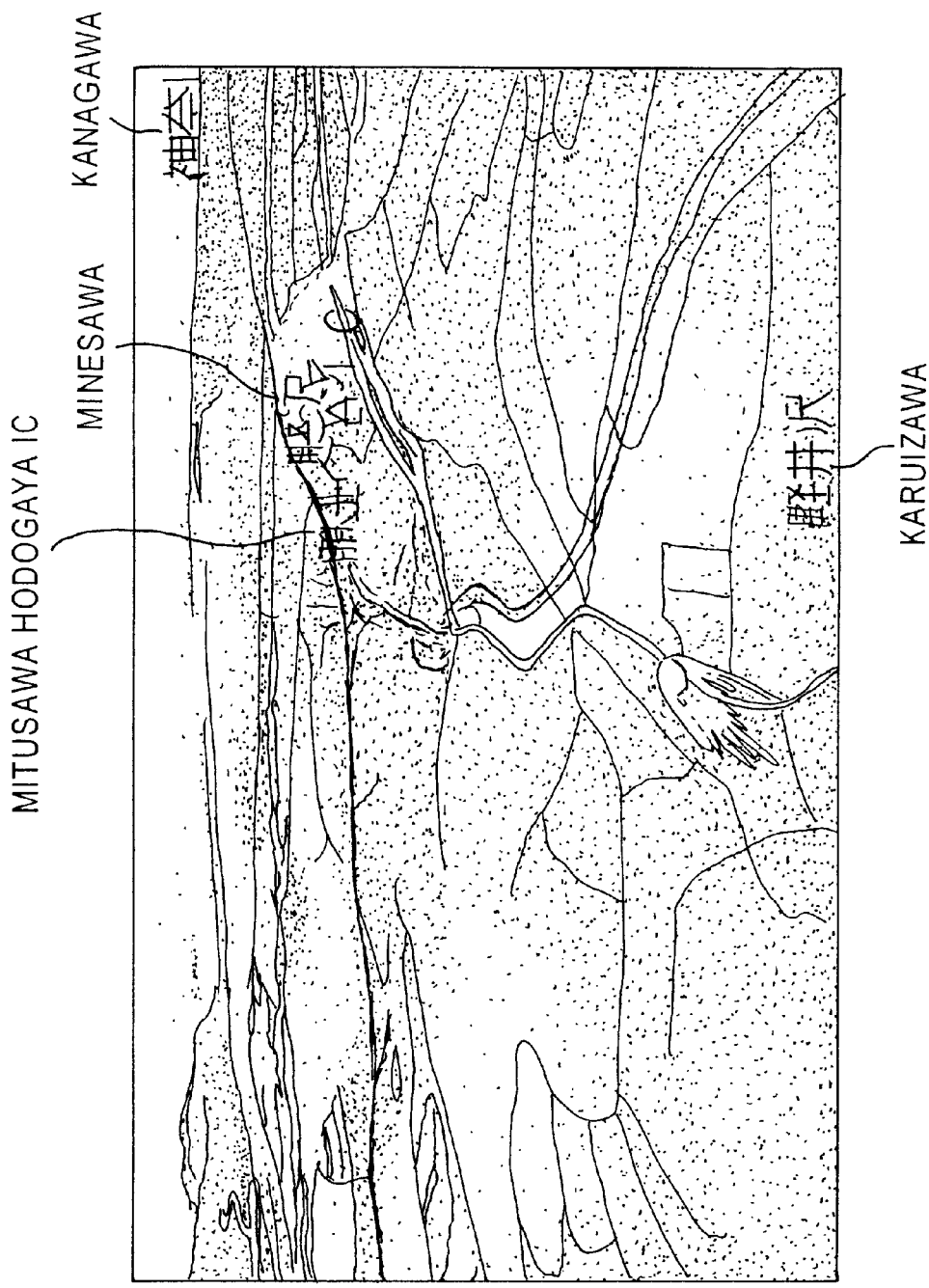
FIG. 20 is a view showing another example of stereoscopic image display of the conventional stereoscopic landform display apparatus

With reference to FIGS. 17 and 18, and using a flowchart, the operation of the stereoscopic landform display apparatus will be explained next. FIGS. 17 and 18 are view showing an example of stereoscopic image display of a stereoscopic landform display apparatus of the second embodiment. Since the flowchart for explaining the operation of the stereoscopic landform display apparatus of the second embodiment is the same as the flowchart shown in FIG. 2 for explaining the operation of the stereoscopic landform display apparatus of the first embodiment except a portion, this feature portion will be explained.

In the present embodiment, a point which is different from the first embodiment is processing in step S29. That is, in step S29, an altitude magnification determining section 917 determines, as an altitude magnification, a quotient obtained by dividing an input value input from a user input section 99 by an actual asperity value when the actual asperity value is the maximum-minimum altitude difference. However, if the quotient obtained by the above division is one or less, the altitude magnification is determined as 1. This actual asperity value is used as the maximum-minimum altitude difference, the altitude magnification is determined using the graph shown in FIG. 6. That is, since the altitude difference of the display region shown in FIGS. 17 to 20 is 400 m or less, if the graph shown in FIG. 6 is used, the altitude magnification is determined as 1. As a result, as shown in FIGS. 17 and 18, undulations of landform is emphasized.

A user uses a user input section 99 to input a value capably of displaying vertical deviation of landform within a desired range. For example, when the stereoscopic landform display apparatus of the present embodiment is applied to a navigator for guiding roads, it is possible to draw map elements of roads, place names and the like by the same processing.

(Third Embodiment)

Figure 10:
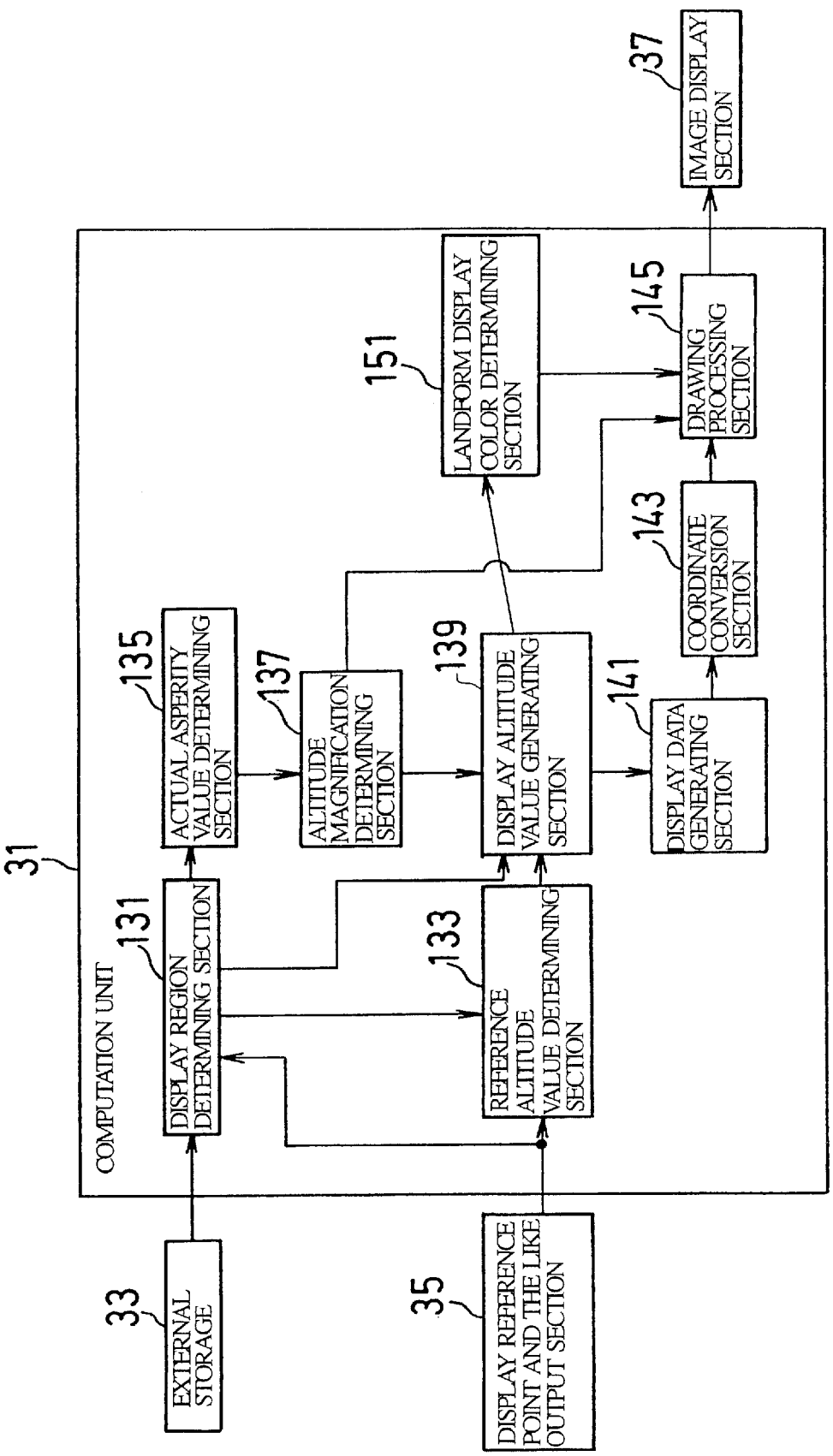
FIG. 10 is a block diagram for showing an example of structure of functional elements of a stereoscopic landform display apparatus according to a third embodiment of the invention.

FIG. 10 is a block diagram showing the structure of a stereoscopic landform display apparatus according to a third embodiment of the present invention.

In FIG. 10, an external storage 33 stores landform data comprising altitude value of actual landform. A display reference point and-the-like output section 35 outputs a display reference point position and a direction angle for determining position and direction of a display subject region. A computation unit 91 performs computations required for displaying stereoscopic landform to display the stereoscopic landform image to an image display section 37.

Further, if the computation unit 31 is divided by function, a display subject region determining section 131 determines a display subject region display on a screen based on the display reference point position and direction angle which are output from the display reference point and-the-like output section 35, and reads necessary landform data from the external storage 33. A reference altitude value determining section 133 determines a display reference point position which is output from the display reference point and-the-like output section 35 and an altitude value of a display reference point based on the read landform data. An actual asperity value determining section 135 determines an actual asperity value which shows terrain roughness qualitatively based on the read landform data. A altitude magnification determining section 137 obtains the altitude magnification based on the actual asperity value which is obtained in the above-described manner. A display altitude value generating section 139 generates the display altitude value by multiplying each of the altitude values which are read in this manner by altitude magnification. A display data generating section 141 makes display design data for displaying landform based on the display altitude value generated in this manner. A coordinate conversion section 143 performs a coordinate conversion from this display design data into image coordinates constituting a stereoscopic landform image. A drawing processing section 145 outputs the display graphic data after coordinate conversion to the image display section 37 as a stereoscopic landform image. A landform display color determining section 151 determines a display color of a spot corresponding to the display altitude value is added.

The flowchart for explaining the operation of the stereoscopic landform display apparatus of the third embodiment is the same as the flowchart shown in FIG. 2 for explaining the operation of the stereoscopic landform display apparatus of the first embodiment except that a section for determining a display color of a spot corresponding to a display altitude value.

Figure 11:
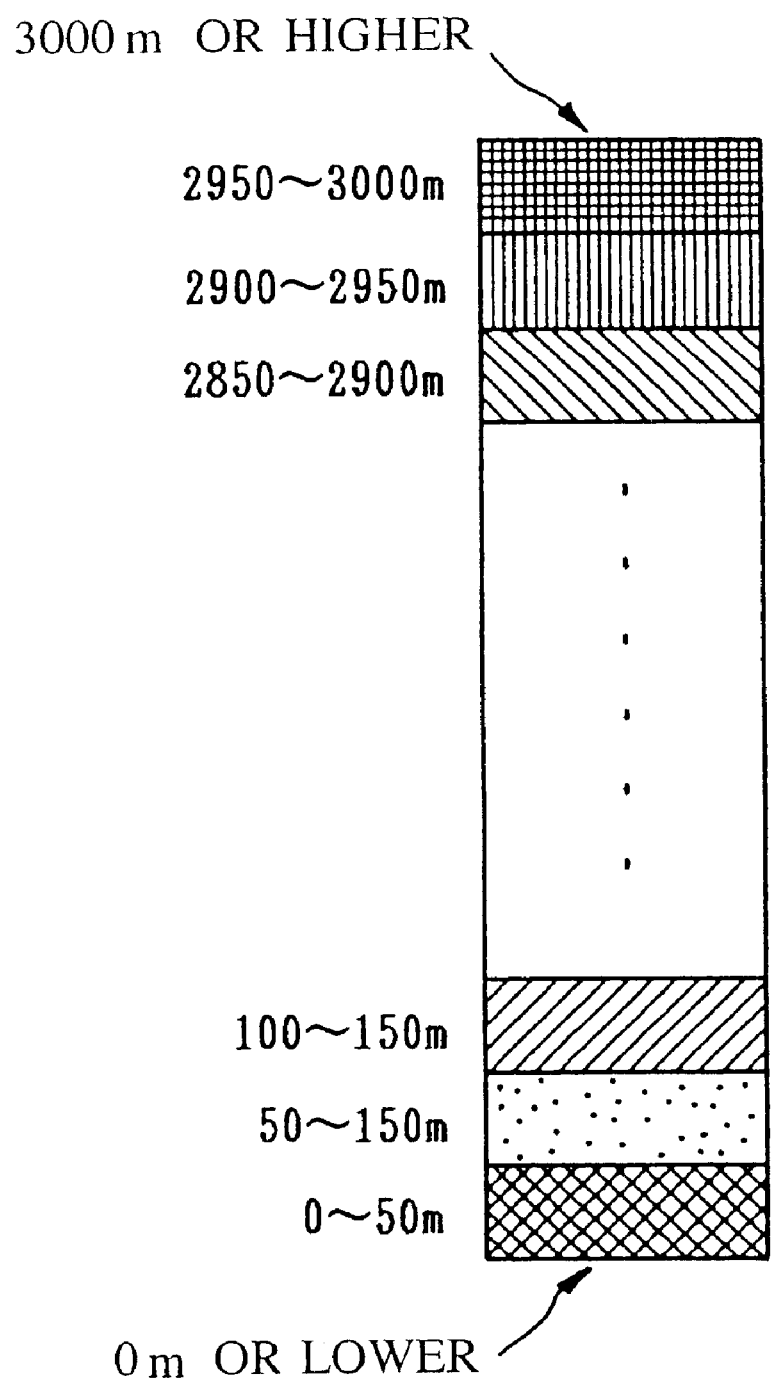
FIG. 11 is a view showing a color table in which different colors are allocated to finely divided altitude value regions.
Figure 12:
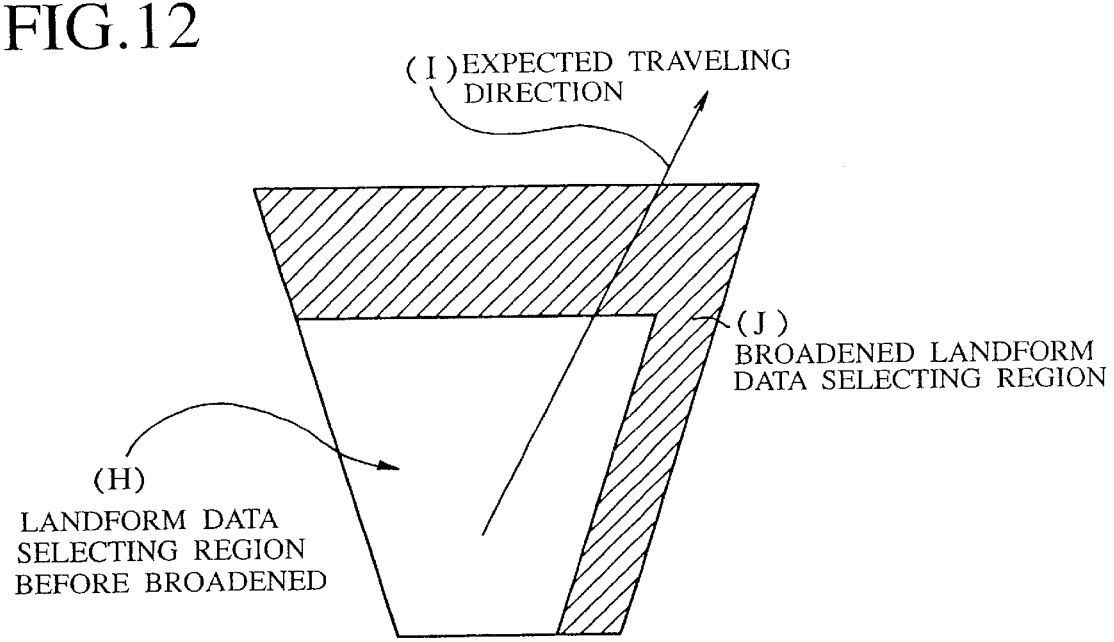
FIG. 12 is a view showing a landform data selection region before broadening and a landform data selection region which is partially broadened along an expected travel direction.
Figure 13:
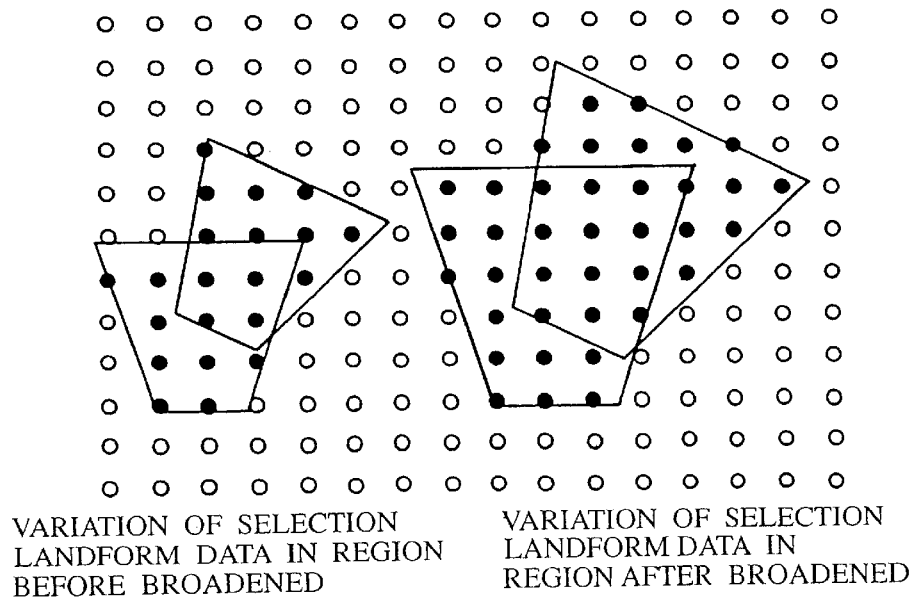
FIG. 13 is a view showing how a selected landform data will change before broadening and after partial broadening in the expected traveling direction for comparison.
Figure 14:
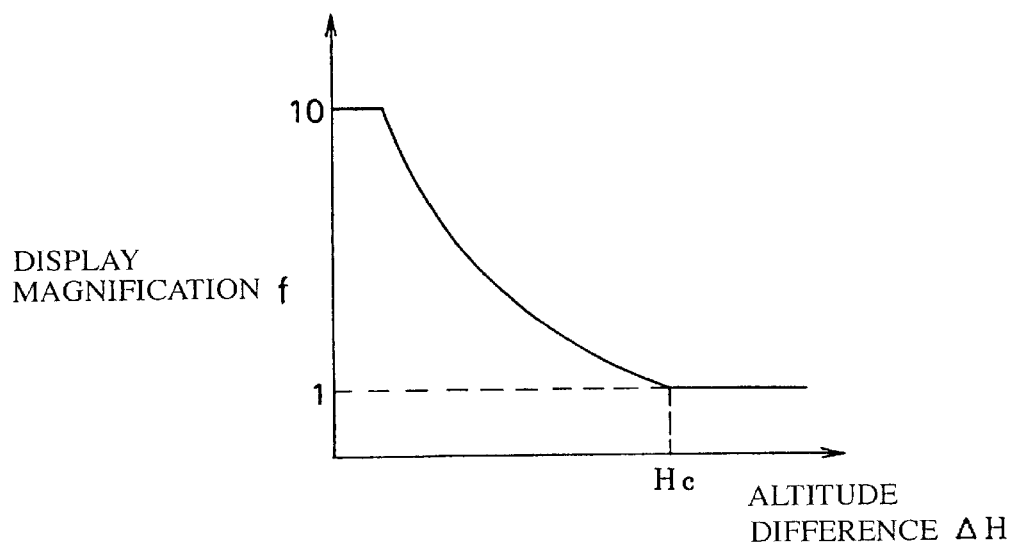
FIG. 14 is a view showing one example of a graph indicating the relation between the altitude difference within a displayed region and the altitude magnification used for actual display.
Figure 15:
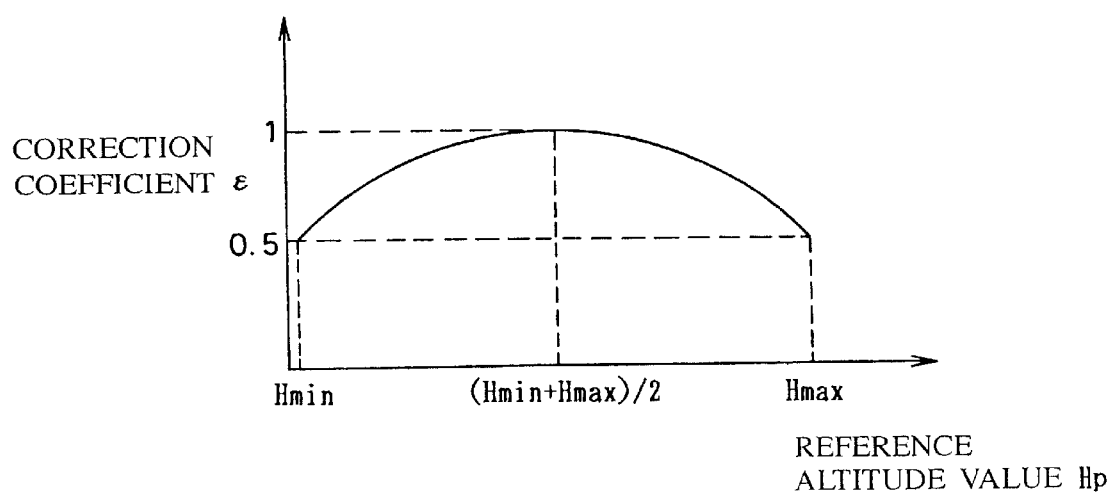
FIG. 15 is a view showing one example of a graph indicating the relation between a correction coefficient and a reference altitude value for calculating an altitude magnification in accordance with altitude different from a position of a vehicle to the highest altitude point or the lowest altitude point.
Figure 16:
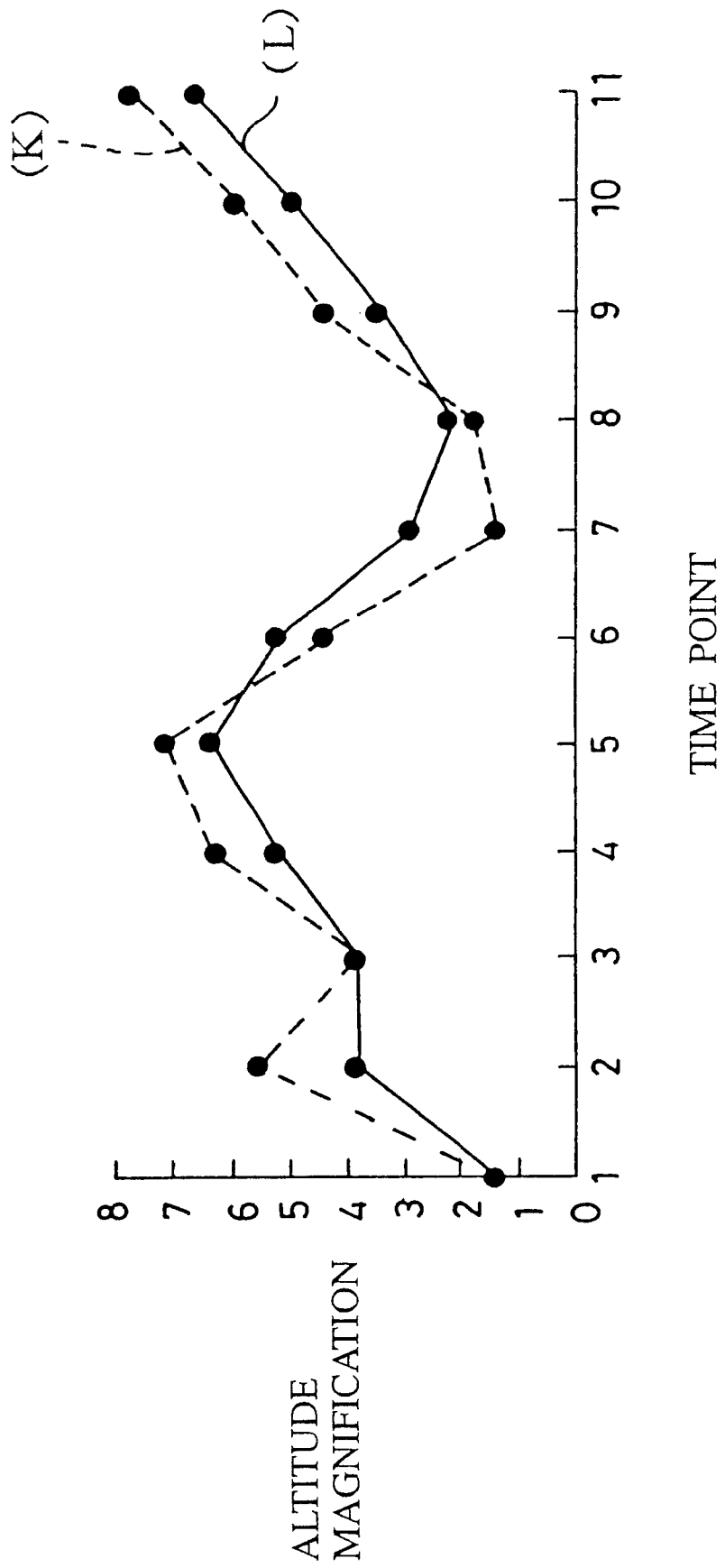
FIG. 16 is a view showing one example of a graph indicating variation in a reference altitude magnification after correction corresponding to time variation at a position of the vehicle and variation of altitude magnification obtained by subjecting this reference altitude magnification to smoothing process.

FIG. 11 is a view showing a color table in which different colors are allocated to finely divided altitude value regions, FIG. 12 is a view showing a landform data selection region before broadening and a landform data selection region which is partially broadened along an expected travel direction, FIG. 13 is a view showing how a selected landform data will change before broadening and after partial broadening in the expected traveling direction for comparison, FIG. 14 is a view showing one example of a graph indicating the relation between the altitude difference within a displayed region and the altitude magnification used for actual display, FIG. 15 is a view showing one example of a graph indicating the relation between a correction coefficient and a reference altitude value for calculating an altitude magnification in accordance with altitude different from a position of a vehicle to the highest altitude point or the lowest altitude point, FIG. 16 is a view showing one example of a graph indicating variation in a reference altitude magnification after correction corresponding to time variation at a position of the vehicle and variation of altitude magnification obtained by subjecting this reference altitude magnification to smoothing process.

With reference to FIGS. 11 to 16, the operation of the stereoscopic landform display apparatus of the third embodiment will be explained below.

In the third embodiment, a landform display color determining section 151 for determining display color of a spot corresponding to the display altitude value based on the display altitude value generated by the display altitude value generating section 139 is added to the first embodiment. The landform display color determining section 151 may determine by referring to a color table in which different colors are allocated to finely divided altitude value regions such that deep green is allocated to altitude values of 0 to 50 m and bright green is allocated to altitude values of 50 to 100 m.

The display altitude value may become extremely small or large depending upon the altitude magnification in some cases. For example, when the altitude magnification is 8 times and the altitude display reference point (reference altitude value) is 150 m, if the spot having the altitude of 100 m, the display altitude value is obtained by multiplying the difference between the spot and the reference altitude value by the magnification as follows:

$$(100-150) \times 8 + 150 = -250 \text{ m}$$

and the display altitude value becomes smaller than 0 m. Under the same conditions, the display altitude value of a spot having altitude of 600 m is $$(600-150) \times 8 + 150 = 3750 \text{ m}$$

and this is a value substantially equal to mountain Fuji. The reason why the display altitude value becomes extremely small or large is that the difference of altitude between the spot and display reference point is large, the spot is usually far from the display reference point, and area around the spot is displayed at high scale in a bird's eye view. Thereupon, in such a case, fine variations of color is unnecessary, only ranges of 0 to 3000 m are defined in the color table as shown in FIG. 11 for example, a range of 0 or less corresponds to display color of 0 m, and a range of 3000 m or greater, corresponds to display color of 3000 m.

In the present embodiment, the display data generating section 141 may use the display altitude value calculated in accordance with the altitude magnification at the time of modeling the landform. Further, an actual altitude value described in original landform data before multiplying the magnification may be used. In the latter case, a displayed landform is not emphasized as a shape, but when a high place exists in the vicinity of the visual point for example, this is emphasized in shape for preventing the line of sight from being obstructed, the view from backward to a far place is secured, and changes of altitude can be visually checked by change of display color. As shown FIG. 19, in a comparative example in which the shape is emphasized previously, it can be found that the shape is not emphasized but display color is emphasized, and asperity of landform is shown with color.

A range of landform data used for determining the actual asperity value may employ a defined region near the visual point as shown in FIG. 12, i.e., a region (J) which partially broadens a region (H) corresponding to the region (C) shown in FIG. 5 in an expected traveling direction (I). Further, as shown in FIG. 13, if the landform data exists in dotted lattice manner, in the former case, among 12 to 13 dots corresponding to landform data within a selected subject region, 2/3 dots are transposed as the visual point moves, but in the latter case, among 25 to 26 dots, only about half of them are transposed, and it is easily expected that the actual asperity value and the altitude magnification of the latter case calculated by these are less varied as the visual point moves.

Here, the above description is based on a condition that the vehicle travels along a predetermined road and the selected range of landform data is broadened in the expected traveling direction, but even when the traveling direction can not be expected, the same effect can be obtained by uniformly broadening the selected range in all directions (except rearward with respect to the line of sight).

Further, when the altitude magnification is determined from the actual asperity value, for example, using, as the actual asperity value, an altitude difference $\Delta H = H_{max} - H_{min}$ wherein the maximum value of altitude value in the region is $H_{max}$ and the minimum value is $H_{min}$, the altitude magnification f used for the above-described display may be calculated in accordance with $$f = Hc/\Delta H.$$

Further, the upper limit of the altitude magnification f may be determined to 10, and if the calculation result of the above equation exceeds 10, the altitude magnification may be determined to 10 uniformly. The first embodiment, $Hc=400$ m, and in the second embodiment, Hc=user input value. With these values, even if the altitude difference $\Delta H$ is extremely smaller than the user input value Hc, it is possible to prevent the altitude magnification f from being varied largely due to rounding error of the altitude difference $\Delta H$. Further, especially in this case, even when the altitude difference $\Delta H$ becomes 0, it is possible to prevent the value from becoming smaller than 0. FIG. 14 shows the variation of the altitude magnification f.

Further, using the altitude value of the display reference point (reference altitude value) Hp, the altitude magnification f which changes depending upon variation in the altitude value Hp even if the altitude difference $\Delta H$ is the same may be defined. For example, if a correction coefficient $\epsilon$ is defined as $$\epsilon = 2(H_{max} - Hp)(Hp - H_{min})/\Delta H^2 + \tfrac{1}{2},$$

as shown in FIG. 15, when the altitude value Hp comes center between the maximum value Hmax and the minimum value Hmin, the maximum value 1 is taken, and as the altitude value moves either one of directions, its value becomes smaller, and when the altitude value coincides with the maximum value Hmax or the minimum value Hmin, $\epsilon$ becomes equal to ½. Using this, if the reference altitude magnification f is determined as follows:

$$f = \epsilon Hc/\Delta H,$$

even if the altitude difference $\Delta H$ is the same, when the vehicle is located at exactly center of the entire altitude distribution, the same display effect as magnification defined by the above equation, and when looking up from a low place to a high place or when looking down from a high place to a low place on the contrary, the emphasizing effect is weakened, and a magnification in accordance with the altitude difference from the position of the vehicle to the altitude maximum point or altitude minimum point.

Further, depending upon the current position of the vehicle, with respect to the above-described reference altitude magnification fn in the current point (time point n) defined as described above, using altitude magnification Fn-i used for display before i time point, smoothing processing is applied in the following manner:

$$Fn = Anfn + An-1 fFn-1 + An-2 fFn-2 + \ldots + An-k Fn-k$$

(wherein, $An + An-1 + An-2 + \ldots + An-k = 1$),
so that the altitude magnification Fn used for display at the current time may be defined.

FIG. 16 sows the variation in reference altitude magnification fn with broken line (K), and the variation in Fn is obtained using the following equation, and this is shown with solid line (L):

$$Fn = 0.6 fn + 0.4 Fn-1.$$

As described above, it can be found that the variation in the altitude magnification Fn becomes gentle as compared with the reference altitude magnification fn.

Finally, the drawing processing section 145 designates and draws a display color determined by a landform display color determining section 39 based on the display altitude value of each of apexes of the landform. Display color of arbitrary point between the apexes is interpolated by display color of the apex.

INDUSTRIAL APPLICABILITY

As described above, the present invention provides a stereoscopic landform display apparatus capable of automatically determining a display altitude value of an altitude value in accordance with asperity state of the landform, and provides a stereoscopic landform display apparatus capable of displaying easy-to-see stereoscopic landform image in accordance with a landform state of a display subject region. Therefore, a wide applicability thereof including a navigator for a vehicle is expected.

What is claimed is:

1. A stereoscopic landform display apparatus comprising:
   landform data storing means for storing landform data including altitude value of a landform;
   display region designating means for designating a display subject region to be displayed;
   computation means which reads said landform data designated by said display subject region from said landform data storing means, obtains altitude magnification for emphasizing and displaying an undulation state of a landform based on said landform data within said region, and performs a computation of a stereoscopic landform image from altitude value which is multiplied by said altitude magnification; and
   image display means for displaying said stereoscopic landform image.

2. A stereoscopic landform display apparatus according to claim 1, wherein said computation means comprises:
   reference altitude value determining means which reads, from said landform data storing means, said landform data in a range covering said display subject region, and determines altitude value of a reference point displayed in said display subject region based on said landform data;
   actual asperity value determining means for determining an actual asperity value indicative of undulation state of said landform based on said landform data which is read;
   altitude magnification determining means for determining said altitude magnification in said display subject region based on said actual asperity value;
   display altitude value generating means for generating display altitude value by multiplying each altitude value forming said landform data which is read, by said altitude magnification;
   display data generating means for generating landform display graphic data which are required for displaying said landform based on said display altitude value;
   coordinate conversion means for carrying out coordinate conversion for said landform display graphic data to a stereoscopic landform image; and
   drawing processing means for drawing said stereoscopic landform image on said image display means.

3. A stereoscopic landform display apparatus according to claim 2, wherein said actual asperity value determining means determines said actual asperity value using said landform data within a region previously defined in the vicinity of said reference point.

4. A stereoscopic landform display apparatus according to claim 2, wherein said altitude magnification determining means includes input means for inputting a value for designating said altitude magnification, and determines a quotient obtained by dividing said value, which is input, by said actual asperity value as said altitude magnification.

5. A stereoscopic landform display apparatus according to claim 2, wherein said altitude magnification determining means determines said altitude magnification such that said altitude magnification becomes equal to a predetermined value or greater.

6. A stereoscopic landform display apparatus according to claim 2, wherein said drawing means visually draws a shape indicative of degree of said altitude magnification independently from drawing of said stereoscopic landform image.

7. A stereoscopic landform display apparatus according to claim 2, wherein said landform data storing means stores map data including map elements including at least roads and place names, in addition to said landform data; said display region designating means reads said map element designated by said display subject region from said landform data storing means together with said landform data; said display data generating means generates display graphic data also with respect to said map element which is read; said coordinate conversion means carries out coordinate conversion also for said display graphic data; and said drawing processing means draws said display graphic data which is coordinate converted together with said landform display graphic data.

8. A stereoscopic landform display apparatus according to claim 2, wherein said actual asperity value determining means broadens up to and refers to said landform data possessed by a region which is not displayed around said display subject region, thereby determining said actual asperity value.

9. A stereoscopic landform display apparatus according to claim 8, wherein said actual asperity value determining means broadens said landform data to be referred along an expectable traveling direction, thereby determining said actual asperity value.

10. A stereoscopic landform display apparatus according to claim 2, wherein said altitude magnification determining means determines said altitude magnification using said altitude value at said display reference point, in addition to said actual asperity value.

11. A stereoscopic landform display apparatus according to claim 2, wherein said altitude magnification determining means determines said altitude magnification by referring also to said altitude magnification which was determined in the past.

12. A stereoscopic landform display apparatus according to claim 2, wherein said altitude magnification determining means determines said altitude magnification such that said altitude magnification becomes equal to a predetermined value or less.

13. A stereoscopic landform display apparatus according to claim 1, wherein said computation means comprises;
   reference altitude value determining means which reads, from said landform data storing means, said landform data in a range covering said display subject region, and determines altitude value of a reference point displayed in said display subject region based on said landform data;
   actual asperity value determining means for determining an actual asperity value indicative of undulation state of said landform based on said landform data which is read;
   altitude magnification determining means for determining said altitude magnification in said display subject region based on said actual asperity value;
   display altitude value generating means for generating display altitude value by multiplying each altitude value forming said landform data which is read, by said altitude magnification;
   landform display color determining means for determining display color of said landform based on said display altitude value;
   display data generating means for generating landform display graphic data which are required for displaying said landform based on said display altitude value or said altitude value;
   coordinate conversion means for carrying out coordinate conversion for said landform display graphic data to a stereoscopic landform image; and drawing processing means for drawing said stereoscopic landform image on said image display means using said landform display color.

14. A stereoscopic landform display apparatus according to claim 8, wherein said landform display color determining means determines said display color corresponding to a predetermined lower limit value instead of said display altitude value when said display altitude value becomes extremely small, and determines said display color corresponding to a predetermined upper limit value instead of said display altitude value when said display altitude value becomes extremely great.

* * * * *